US010394321B2

(12) United States Patent
Ding et al.

(10) Patent No.: US 10,394,321 B2
(45) Date of Patent: Aug. 27, 2019

(54) INFORMATION ACQUIRING METHOD, INFORMATION ACQUIRING APPARATUS, AND USER EQUIPMENT

(71) Applicant: Beijing Zhigu Rui Tuo Tech Co., Ltd, Beijing (CN)

(72) Inventors: Dayong Ding, Beijing (CN); Kuifei Yu, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 122 days.

(21) Appl. No.: 15/565,365

(22) PCT Filed: Apr. 7, 2016

(86) PCT No.: PCT/CN2016/078724
§ 371 (c)(1),
(2) Date: Oct. 9, 2017

(87) PCT Pub. No.: WO2016/161954
PCT Pub. Date: Oct. 13, 2016

(65) Prior Publication Data
US 2018/0067549 A1    Mar. 8, 2018

(30) Foreign Application Priority Data
Apr. 10, 2015   (CN) .......................... 2015 1 0169143

(51) Int. Cl.
G06K 9/00          (2006.01)
G06F 3/01          (2006.01)
(Continued)

(52) U.S. Cl.
CPC .........  G06F 3/013 (2013.01); G02B 27/0093 (2013.01); G06F 3/01 (2013.01);
(Continued)

(58) Field of Classification Search
None
See application file for complete search history.

(56) References Cited

U.S. PATENT DOCUMENTS 8,317,328 B1 *  11/2012  Harris .................. A61B 5/4863
                                                         351/210
9,035,874 B1 *  5/2015   Fowers .................... G06F 3/013
                                                         345/156
(Continued)

FOREIGN PATENT DOCUMENTS

CN          1705454 A       12/2005
CN          101311882 A     11/2008
(Continued)

OTHER PUBLICATIONS

International Search Report for PCT Application No. PCT/CN2016/078724, dated Jul. 8, 2016, 3 pages.
(Continued)

*Primary Examiner* — Hadi Akhavannik
(74) *Attorney, Agent, or Firm* — Amin, Turocy & Watson, LLP

(57)  ABSTRACT

An information acquiring apparatus method, an information acquiring apparatus, and a user equipment are provided. A method comprises: acquiring, in response to that an eye of a user in a motion state is in a smooth pursuit eye movement state, information about a change of an angle of a line-of-sight direction of the user relative to a gaze point of the user at a moment, and information about motion of the user relative to the gaze point at the moment; and acquiring, according to the angle change information and the motion information, information about a distance of the gaze point relative to the user at the moment. In this regard, a position of an object of interest of a user in a motion state can be conveniently determined by tracing an eye of the user.

22 Claims, 7 Drawing Sheets

(51) Int. Cl.
*G02B 27/00* (2006.01)
*G09G 5/38* (2006.01)

(52) U.S. Cl.
CPC ..... *G06K 9/00604* (2013.01); *G06K 9/00845* (2013.01); *G09G 5/38* (2013.01)

(56) References Cited

U.S. PATENT DOCUMENTS

| | | | |
|---|---|---|---|
| 9,070,017 | B2 | 6/2015 | Hennessey et al. |
| 9,092,051 | B2 | 7/2015 | Park et al. |
| 9,405,365 | B2 | 8/2016 | Publicover et al. |
| 9,426,447 | B2 | 8/2016 | Lee et al. |
| 9,740,281 | B2 | 8/2017 | Li |
| 9,766,700 | B2 | 9/2017 | Lyons et al. |
| 9,975,483 | B1 * | 5/2018 | Ramaswamy ......... B60Q 11/00 |
| 2007/0132950 | A1 * | 6/2007 | Victor .................. A61B 3/036 351/200 |
| 2010/0056274 | A1 * | 3/2010 | Uusitalo .............. G02B 27/017 463/31 |
| 2010/0201621 | A1 | 8/2010 | Niikawa |
| 2011/0228975 | A1 | 9/2011 | Hennessey et al. |
| 2012/0294478 | A1 | 11/2012 | Publicover et al. |
| 2013/0135196 | A1 | 5/2013 | Park et al. |
| 2013/0293844 | A1 * | 11/2013 | Gross ................... A61B 3/0025 351/209 |
| 2014/0043227 | A1 * | 2/2014 | Skogo .................... G06F 1/325 345/156 |
| 2014/0055339 | A1 * | 2/2014 | Stanasolovich .......... G09G 5/00 345/156 |
| 2014/0098198 | A1 | 4/2014 | Lee et al. |
| 2014/0152792 | A1 * | 6/2014 | Krueger ................ A61M 21/00 348/78 |
| 2014/0154650 | A1 | 6/2014 | Stack |
| 2015/0128075 | A1 | 5/2015 | Kempinski |
| 2015/0338915 | A1 * | 11/2015 | Publicover ........... G06K 9/0061 345/633 |
| 2016/0109945 | A1 * | 4/2016 | Kempinski ............. G06F 3/013 348/78 |
| 2016/0280136 | A1 * | 9/2016 | Besson .................... B60R 1/00 |

FOREIGN PATENT DOCUMENTS

| | | |
|---|---|---|
| CN | 103135762 A | 6/2013 |
| CN | 103557859 A | 2/2014 |
| CN | 103604412 A | 2/2014 |
| CN | 103809737 A | 5/2014 |
| CN | 103988149 A | 8/2014 |
| WO | 2013089693 A1 | 6/2013 |
| WO | 2013168173 A1 | 11/2013 |

OTHER PUBLICATIONS

Chinese Office Action dated Jul. 4, 2018 for Chinese Application No. 201510169143.X, 9 pages (with translation).

* cited by examiner

INFORMATION ACQUIRING METHOD, INFORMATION ACQUIRING APPARATUS, AND USER EQUIPMENT

RELATED APPLICATION

The present application is a U.S. National Stage filing under 35 U.S.C. § 371 of international patent cooperation treaty (PCT) application No. PCT/CN2016/078724, filed Apr. 7, 2016, and entitled "INFORMATION ACQUIRING METHOD, INFORMATION ACQUIRING APPARATUS, AND USER EQUIPMENT", which claims the benefit of priority to Chinese Patent Application No. 201510169143.X, filed on Apr. 10, 2015, which applications are hereby incorporated into the present application by reference herein in their respective entireties.

TECHNICAL FIELD

The present application relates to human-computer interaction, and, for example, to an information acquiring apparatus method, an information acquiring apparatus, and a user equipment.

BACKGROUND

In some application scenarios, determining a position of an object of interest of a user relative to the user may be used to: determine the object of interest of the user, automatic focus for photography, locate the user according to the object whose coordinates are known, determine whether attention of the user is distracted, and perform other operations. When a user gazes an object in motion, a phenomenon of smooth pursuit eye movement generally occurs. The smooth pursuit eye movement is an eye movement behavior of continuous visual pursuit of a motion object of interest of the user in an environment.

SUMMARY

A possible objective of embodiments of the present application is to provide a technical solution for information acquisition.

According to a first aspect, an example embodiment of the present application provides an information acquiring method, comprising:

acquiring, in response to that an eye of a user in a motion state is in a smooth pursuit eye movement state, information about a change of an angle of a line-of-sight direction of the user relative to a gaze point of the user at at least one moment, and information about motion of the user relative to the gaze point at the at least one moment; and acquiring, according to the angle change information and the motion information, information about a distance of the gaze point relative to the user at the at least one moment.

According to a second aspect, an example embodiment of the present application provides an information acquiring apparatus, comprising:

an information acquiring module, configure to acquire, in response to that an eye of a user in a motion state is in a smooth pursuit eye movement state, information about a change of an angle of a line-of-sight direction of the user relative to a gaze point of the user at at least one moment, and information about motion of the user relative to the gaze point at the at least one moment; and a distance acquiring module, configured to acquire, according to the angle change information and the motion information, information about a distance of the gaze point relative to the user at the at least one moment.

According to a third aspect, an example embodiment of the present application provides a user equipment, comprising the foregoing information acquiring apparatus.

According to at least one example embodiment of the present application, when an eye of a user in a motion state is in a smooth pursuit eye movement state, eye movement information and motion information of the user are acquired, to determine a distance of a gaze point of the user relative to the user, so as to conveniently determine a position of an object of interest of the user in the motion state by tracing the eye of the user.

DETAILED DESCRIPTION

Figure 1:
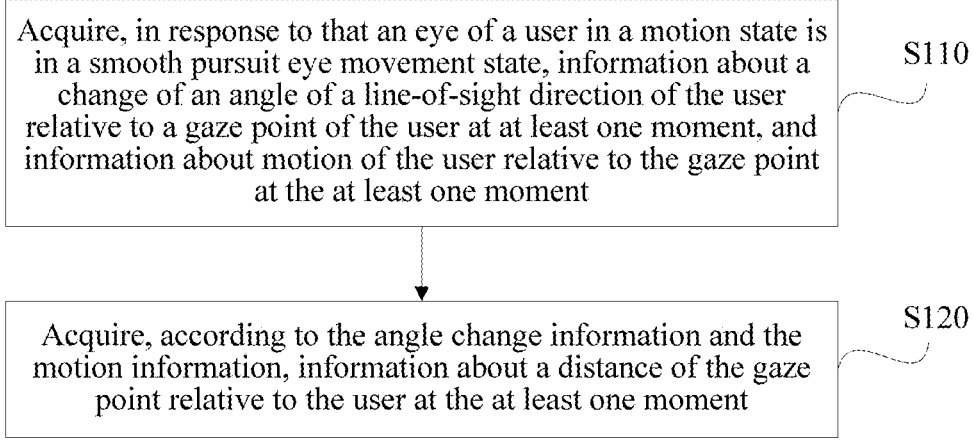
FIG. 1 is a flowchart of an information acquiring method in an example embodiment of the present application.

Example embodiments of the present application are further described below in detail with reference to the accompanying drawings (same reference numerals represent same elements in the accompanying drawings) and embodiments. The embodiments described below are used to illustrate the present application, and are not used to limit the scope of the present application.

Persons skilled in the art may understand, the terms "first" and "second" are used herein merely to distinguish different steps, devices and modules, and does not represent any specified technical meanings nor indicate a necessary logical sequence between them.

In a scenario, for example, in which a user drives or takes a moving vehicle, the user is in a motion state. In such a situation, if the user is interested in another object (for example, a roadside stationary object) except the vehicle and keeps gazing at the other object, it may be considered that the other object moves relative to the user. In this case, the eye movement of the user is in a smooth pursuit eye movement state. Therefore, an object of interest of the user may be determined by means of smooth pursuit eye movement of the user in the motion state, and a position of the object relative to the user may be determined by using the following method or apparatus.

As shown in FIG. 1, an example embodiment of the present application provides an information acquiring method, comprising:

S110: Acquire, in response to that an eye of a user in a motion state is in a smooth pursuit eye movement state, information about a change of an angle of a line-of-sight direction of the user relative to a gaze point of the user at at least one moment, and information about motion of the user relative to the gaze point at the at least one moment.

S120: Acquire, according to the angle change information and the motion information, information about a distance of the gaze point relative to the user at the at least one moment.

For example, an information acquiring apparatus provided by the present application is used as an execution body of this embodiment, and executes S110 and S120. Specifically, the information acquiring apparatus may be disposed in a user equipment in a manner of software, or hardware, or software plus hardware; or the information acquiring apparatus is a user equipment. The user equipment comprises, but is not limited to, a smart phone, a pair of smart glasses, and a smart helmet; and the smart glasses comprise smart spectacles and smart contact lenses.

According to an example embodiment of the present application, when an eye of a user in a motion state is in a smooth pursuit eye movement state, eye movement information and motion information of the user are acquired, to determine a distance of a gaze point of the user relative to the user, so as to conveniently determine a position of an object of interest of the user in the motion state by tracing the eye of the user.

The steps of the present application are further described in the following implementation manners.

In an example embodiment, optionally, before the S110, the method may further comprise:

determining whether the eye of the user is in the smooth pursuit eye movement state.

In an example embodiment, optionally, the determining whether the eye of the user is in the smooth pursuit eye movement state may comprise:

acquiring at least one image, wherein the at least one image comprises an eye area corresponding to the eye of the user; and analyzing the at least one image, and determining whether the eye of the user is in the smooth pursuit eye movement state.

In an example embodiment, the information acquiring apparatus, for example, may be disposed on a head-mounted device, an image capture component is disposed on the information acquiring apparatus, and the image capture component is configured to acquire the at least one image of the eye of the user.

In other example embodiments, the information acquiring apparatus may acquire the at least one image from at least one external device (for example, the foregoing head-mounted device) in a manner of communication.

Persons skilled in the art may know that other possible methods for determining whether the eye of the user is in the smooth pursuit eye movement state may also be applied in this embodiment of the present application. For example, in a possible embodiment, by using a search coil disposed at the eye of the user, the smooth pursuit eye movement may be determined according to a current change of the search coil.

In a possible embodiment, the acquiring the angle change information comprises:

acquiring the angle change information at least according to movement information of the eye of the user.

In a possible application scenario, for example, at the at least one moment, a motion direction of the user does not change, and a head direction of the user does not change, either. In this case, the angle change information may be acquired according to the movement information.

In a possible embodiment, optionally, the angle change information may comprise:

information about a first angle, at a first moment, of a line of sight of the user relative to an object gazed by the user, and information about a second angle of the line of sight of the user relative to the object at a second moment. The at least one moment comprises the first moment and the second moment. In some example embodiments, a time difference between the first moment and the second moment may be in a preset time range.

In a possible embodiment, optionally, the angle change information may comprise: information about an angle velocity of the line of sight of the user relative to the object at any moment of the at least one moment, wherein the angle velocity information comprises: angle velocity value information and angle velocity direction information.

In a possible embodiment, optionally, angle velocity information at a moment may be determined by using two pieces of information about an angle of the line of sight of the user relative to the object and respectively corresponding to two moments.

Persons skilled in the art can see that, in the foregoing example embodiments, line-of-sight direction information and movement information of an eye of a user can be determined by photographing the surface of the eye of the user by using an existing head-mounted device, so as to acquire gaze point information in the following manners.

In another possible embodiment, optionally, information about an angle velocity of the line of sight of the user relative to the object at a moment may be directly acquired by using a motion detection component on the eye of the user.

In a possible application scenario, for example, at the at least one moment, a motion direction of the user does not change, but the head of the user may move. In this case, the acquiring the angle change information may comprise:

acquiring the angle change information according to motion posture information of the head of the user and the movement information of the eye.

For example, the motion posture information may be acquired by using a motion posture sensor of a head-mounted device of the user.

In a possible embodiment, for example, the user is on a motion carrier; and the acquiring the angle change information comprises:

acquiring the angle change information according to the movement information of the eye of the user and direction change information of the motion carrier.

It is noted, in a possible application scenario, for example, a motion direction of the motion carrier may change, and a head posture of the user may also change. In this case, for example, the angle change information needs to be acquired according to the movement information of the eye of the user, motion posture information of the head of the user, and direction change information of the motion carrier.

In a possible application scenario, for example, an object of interest of the user is stationary. In this case, in a possible implementation manner, the acquiring the motion information comprises: acquiring first motion information of the user as the motion information.

Herein, the first motion information, for example, can comprise motion direction information and motion speed information of the user.

The first motion information, for example, can be acquired by using a position or motion sensor on the user.

In another possible application scenario, for example, the object of interest of the user may also move. In this case, in a possible implementation manner, the acquiring the motion information can also comprise:

acquiring second motion information of an object corresponding to the gaze point; and acquiring the motion information according to the first motion information and the second motion information.

In a possible embodiment, for example, the second motion information may be acquired by means of communication with the object.

In another possible embodiment, for example, the second motion information of the object may also be acquired by using a motion sensor on the user side. The motion sensor, for example, may be an image capture component configured to acquire an image(s) of the object.

As described above, in a possible implementation manner, the user is on a motion carrier. In this implementation manner, the acquiring the first motion information comprises:

acquiring third motion information of the motion carrier as the first motion information.

For example, in an example embodiment, the motion carrier is a car, and the third motion information may be acquired by using a speedometer and a direction detection apparatus on the car.

For instance, in an example embodiment, the user may also move on the motion carrier, and in this case, the first motion information may be acquired according to the third motion information and fourth motion information of motion of the user relative to the motion carrier. In this regard, in a possible embodiment, when the fourth motion information can be ignored as compared with the third motion information, it may use only the third motion information as the first motion information.

Optionally, in an example embodiment, the acquiring the distance information according to the angle change information and the motion information comprises:

acquiring, according to the angle change information, information about a value of an angle velocity and a direction of the angle velocity of the user relative to the gaze point at any moment of at least another moment;

acquiring information about a linear velocity of the user at the any moment in the angle velocity direction according to the motion information; and acquiring a distance of the gaze point relative to the user at the any moment according to the angle velocity value information and the liner velocity information.

In an example embodiment, the at least one moment comprises: a first moment and a second moment.

Optionally, the acquiring the distance information according to the angle change information and the motion information comprises:

acquiring, according to the angle change information, information about a first angle of the line-of-sight direction relative to the gaze point at the first moment, and information about a second angle of the line-of-sight direction relative to the gaze point at the second moment;

acquiring, according to the motion information, information about a displacement between a first position of the user relative to the gaze point at the first moment and a second position of the user relative to the gaze point at the second moment; and acquiring, according to the first angle information, the second angle information, and the displacement information, the distance information corresponding to the first moment and/or the second moment.

Figure 2A:
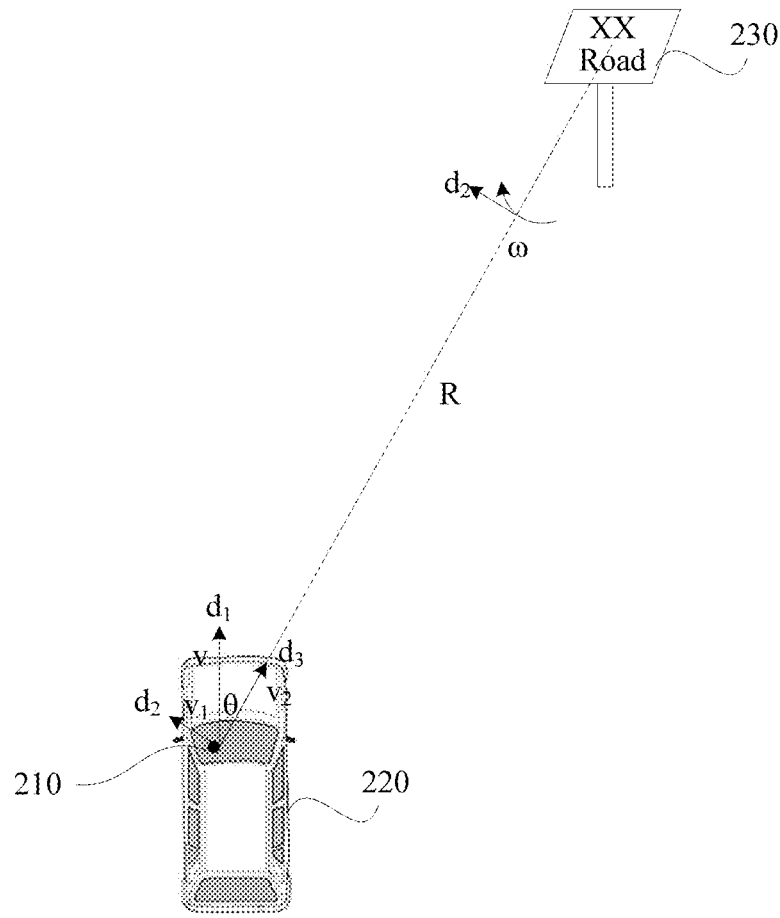
FIG. 2a and FIG. 2b are schematic diagrams of two application scenarios of an information acquiring method in an example embodiment of the present application.
Figure 2B:
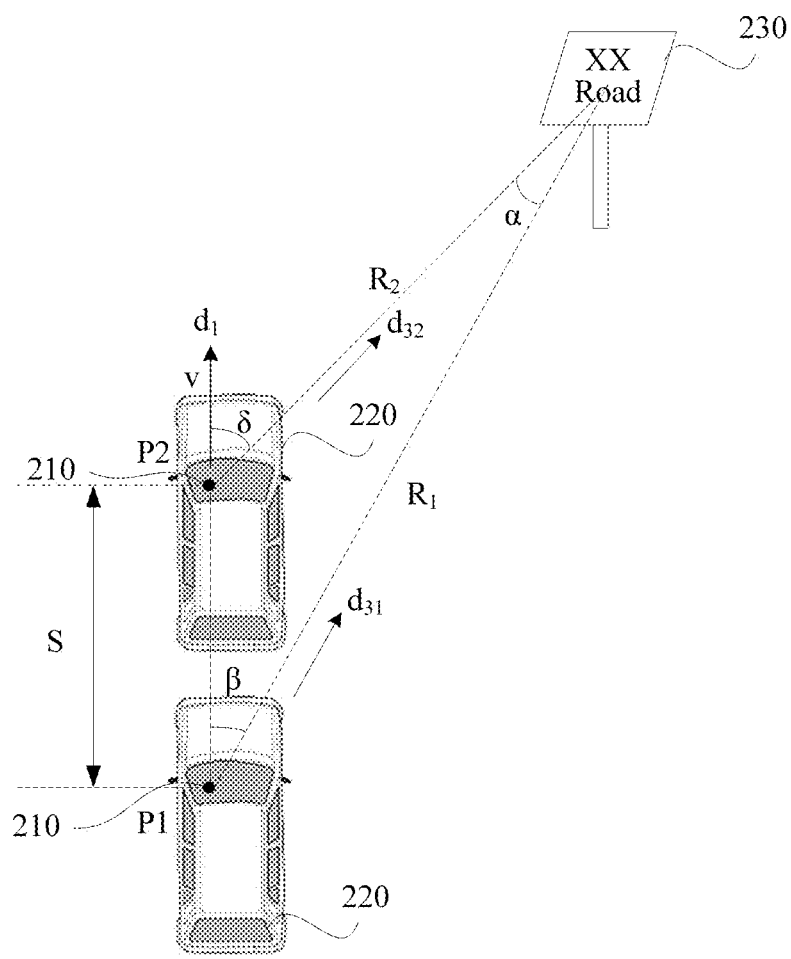

The method of the present application is further described with reference to the following example application scenario:

As shown in FIG. 2a and FIG. 2b, a user 210 is a driver of a motion carrier 220. In this application scenario, the motion carrier 220 is a car, and the car moves at a constant speed of v in a motion direction $d_1$. Persons skilled in the art may know that, in other possible application scenarios, the motion carrier may also be other motion carrier that can carry the user, such as a motor vehicle, a bicycle, a snowboard, a skateboard, a pair of roller skates, a ship, or an air vehicle.

In the car driving process, the user 210 gazes at an indication of a road sign 230, and in this case, it may be detected that an eye of the user 210 is in a smooth pursuit eye movement state.

When it is detected that the eye of the user 210 is in the smooth pursuit eye movement state, information about a change of an angle of a line of sight of the user 210 relative to the road sign 230 and information about motion of the user 210 relative to the road sign 230 are acquired.

In this application scenario, because the road sign 230 is stationary, the information about motion of the user 210 relative to the road sign 230 is motion information of the car: the motion direction is $d_1$, and the speed is v.

In this application scenario, for example, the direction of the car does not change, and the user keeps a head posture of gazing the road sign 230 basically unchanged in the driving process. Therefore, in this application scenario, the angle change information may be acquired by using movement information of the eye of the user.

In an example embodiment, as shown in FIG. 2a, angle change information corresponding to a moment and acquired by using the method described in the foregoing example embodiments may be that, for example, an angle velocity is $\omega$, and an angle velocity direction is $d_2$ and is perpendicular to the line-of-sight direction $d_3$.

It may be seen from FIG. 2 that, at the moment, the speed v may be divided into a first component $v_1$ in the angle velocity direction $d_2$ and a second component $v_2$ in the line-of-sight direction $d_3$. The first component $v_1 = v \sin \theta$.

At the moment, assuming that a distance between the road sign 230 and the user 210 is R, according to an angle velocity calculation formula $\omega=v_1/R$, it may be obtained that $R=v\sin\theta/\omega$).

In another possible embodiment, as shown in FIG. 2*b*, at a first moment $t_1$, the user 210 is at a first position P1, and at a second moment $t_2$, the user 210 is at a second position P2.

According to the motion information of the car, it may be obtained that a displacement between the first position P1 and the second position P2 meets $S=v*(t_2-t_1)$.

According to the movement information of the eye of the user, an included angle α between a first line of sight corresponding to the first moment $t_1$ and a second line of sight corresponding to the second moment $t_2$ may be obtained.

According to the line-of-sight direction of the user and the motion direction of the car, an included angle β between the motion direction $d_1$ and a first line-of-sight direction $d_{31}$ at the first moment $t_1$ and an included angle δ between the motion direction $d_1$ of the user and a second line-of-sight $d_{32}$ at the second moment $t_2$ may be obtained.

According to the property of a triangle, a first distance $R_1$ between the first position P1 and the road sign 230 and a second distance $R_2$ between the second position P2 and the road sign 230 may be obtained.

Persons skilled in the art may understand that, by using the foregoing method, information about a distance from a user to a gaze point of the user at any moment when an eye of the user is in a smooth pursuit eye movement state may be acquired, and in combination with a gaze direction of the user at the any moment, the gaze point of the user may be located conveniently.

Persons skilled in the art may understand that, in the foregoing method in the specific implementation manners of the present application, sequence numbers of steps do not mean an execution sequence, and the execution sequence of the steps should be determined by functions and internal logic of the steps, and should not be a limitation to the example embodiments of the present application.

Figure 3:
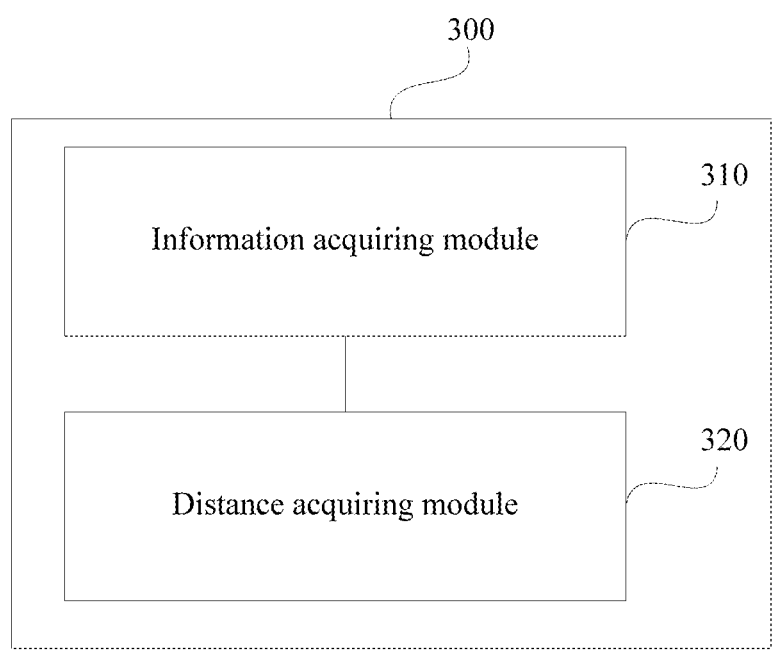
FIG. 3 is a schematic structural block diagram of an information acquiring apparatus in an example embodiment of the present application.

As shown in FIG. 3, an example embodiment of the present application provides an information acquiring apparatus 300, comprising:

an information acquiring module 310, configured to: in response to that an eye of a user in a motion state is in a smooth pursuit eye movement state, acquire information about a change of an angle of a line-of-sight direction of the user relative to a gaze point of the user at at least one moment, and information about motion of the user relative to the gaze point at the at least one moment; and a distance acquiring module 320, configured to acquire, according to the angle change information and the motion information, information about a distance of the gaze point relative to the user at the at least one moment.

According to this embodiment of the present application, when an eye of a user in a motion state is in a smooth pursuit eye movement state, eye movement information and motion information of the user are acquired, to determine a distance of a gaze point of the user relative to the user, so as to conveniently determine a position of an object of interest of the user in the motion state by tracing the eye of the user.

Modules and units of the present application are further described in the following implementation manners.

Figure 4A:
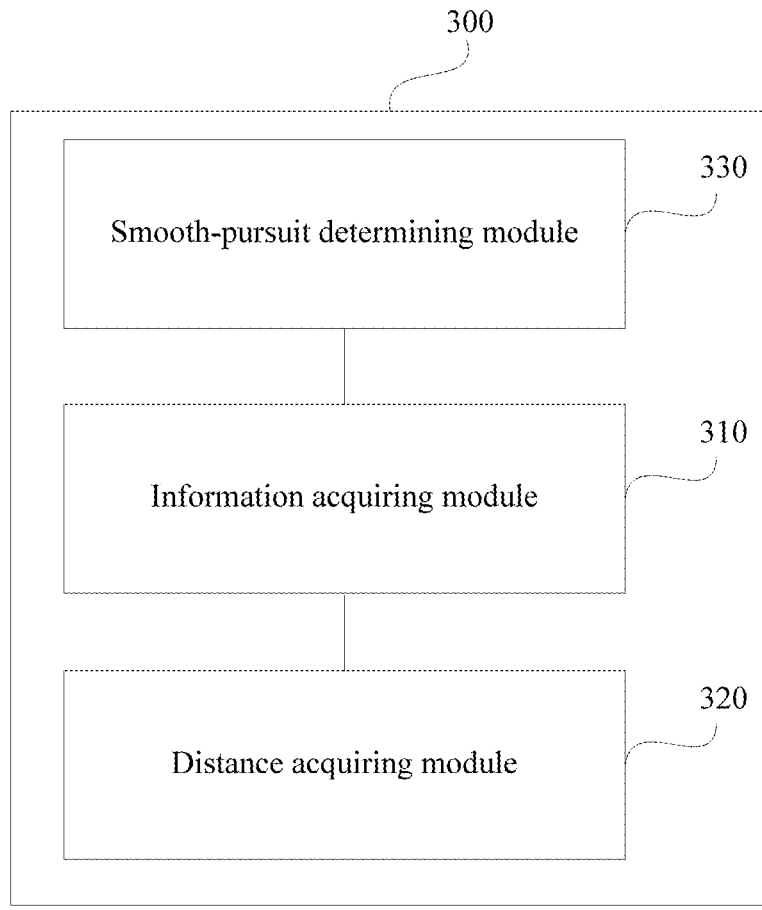
FIG. 4a is a schematic structural block diagram of an information acquiring apparatus in an example embodiment of the present application.

As shown in FIG. 4*a*, in an example embodiment, optionally, the apparatus 300 further comprises:

a smooth-pursuit determining module 330, configured to determine whether the eye of the user is in the smooth pursuit eye movement state.

Figure 4B:
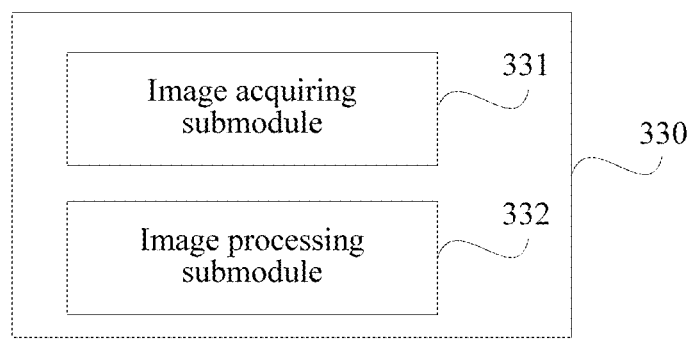
FIG. 4b is a schematic structural block diagram of a smooth-pursuit determining module of an information acquiring apparatus in an example embodiment of the present application.

In a possible embodiment, optionally, as shown in FIG. 4*b*, the smooth-pursuit determining module 330 comprises:

an image acquiring submodule 331, configured to acquire at least one image, wherein the at least one image comprises an eye area corresponding to the eye of the user; and an image processing submodule 332, configured to analyze the at least one image, and determine whether the eye of the user is in the smooth pursuit eye movement state.

In a possible embodiment, the image acquisition submodule 331 may be at least one image capture apparatus, configured to capture the at least one image.

In another possible embodiment, the image acquisition submodule 331 may comprise a communication unit, configured to acquire the at least one image from at least one external device.

Persons skilled in the art may know that other possible smooth-pursuit determining modules configured to determine whether the eye of the user is in the smooth pursuit eye movement state may also be applied in the implementation manner of this embodiment of the present application.

Figure 4C:
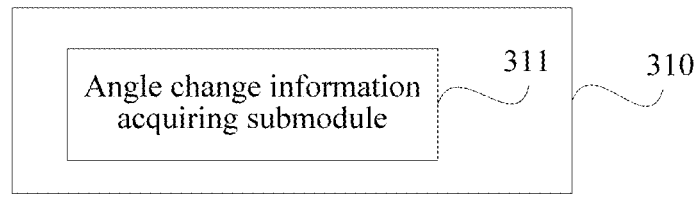
FIG. 4c is a schematic structural block diagram of an information acquiring module of an information acquiring apparatus in an example embodiment of the present application.

As shown in FIG. 4*c*, in an example embodiment, the information acquiring module 310 comprises:

an angle change information acquiring submodule 311, configured to acquire the angle change information at least according to movement information of the eye of the user.

In a possible embodiment, for example, the angle change information acquiring submodule 311 may comprise an image capture component, configured to capture an image of the surface of the eye of the user to determine the movement information of the eye.

In other possible embodiments, optionally, the movement information may also be acquired by using other eye movement sensors. For example, the movement information may be acquired by using an eye movement detection apparatus.

In another example embodiment, optionally, the angle change information acquiring submodule 311 may further comprise a communication unit, configured to acquire the movement information from at least one external device.

For a further description of the angle change information, refer to a corresponding description in the embodiment shown in FIG. 1.

Figure 4D:
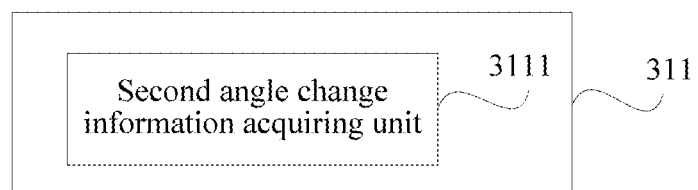
FIG. 4d and FIG. 4e are two schematic structural block diagrams of an angle change information acquiring submodule of an information acquiring apparatus in an example embodiment of the present application.

In a possible application scenario, for example, at the at least one moment, a motion direction of the user does not change, but the head of the user may move. In this case, in a possible implementation manner, optionally, as shown in FIG. 4*d*, the angle change information acquiring submodule 311 comprises:

a second angle change information acquiring unit 3111, configured to acquire the angle change information at least according to motion posture information of the head of the user and the movement information of the eye.

For example, the motion posture information may be acquired by using a motion posture sensor of a head-mounted device of the user.

In a possible application scenario, the user is on a motion carrier.

Figure 4E:
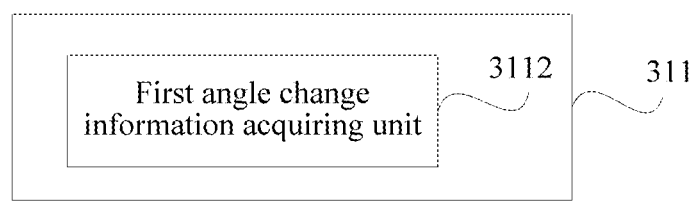

In this application scenario, optionally, as shown in FIG. 4*e*, the angle change information acquiring submodule 311 may comprise:

a first angle change information acquiring unit 3112, configured to acquire the angle change information at least according to the movement information of the eye of the user and direction change information of the motion carrier.

In a possible application scenario, for example, a motion direction of the motion carrier may change, and a head posture of the user may also change. In this case, for example, the angle change information needs to be acquired according to the movement information of the eye of the user, motion posture information of the head of the user, and direction change information of the motion carrier.

Figure 4F:
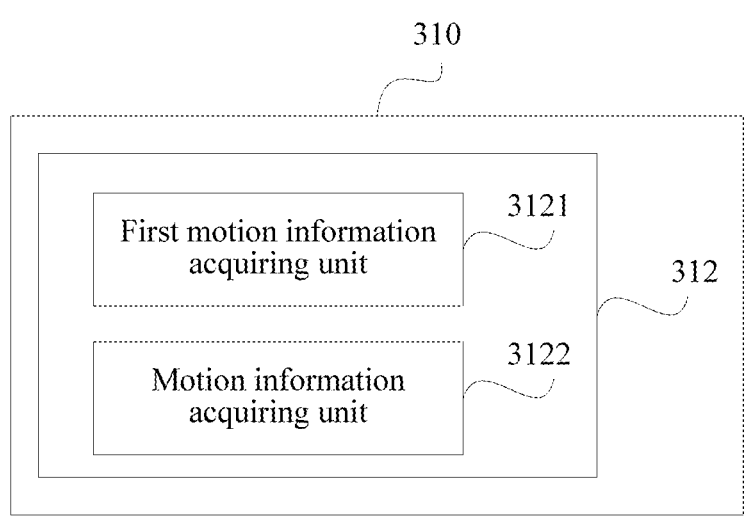
FIG. 4f is a schematic structural block diagram of an information acquiring module of an information acquiring apparatus in an example embodiment of the present application.

In a possible application scenario, for example, an object of interest of the user is stationary. In this case, as shown in FIG. 4f, optionally, the information acquiring module 310 comprises a motion information acquiring submodule 312, wherein the motion information acquiring submodule 312 comprises:

a first motion information acquiring unit 3121, configured to acquire first motion information of the user; and a motion information acquiring unit 3122, configured to acquire the motion information according to the first motion information.

Herein, the first motion information, for example, may comprise motion direction information and linear velocity information of the user.

The first motion information acquiring unit 3121, for example, may be a position sensor or a motion sensor on the user.

Figure 4G:
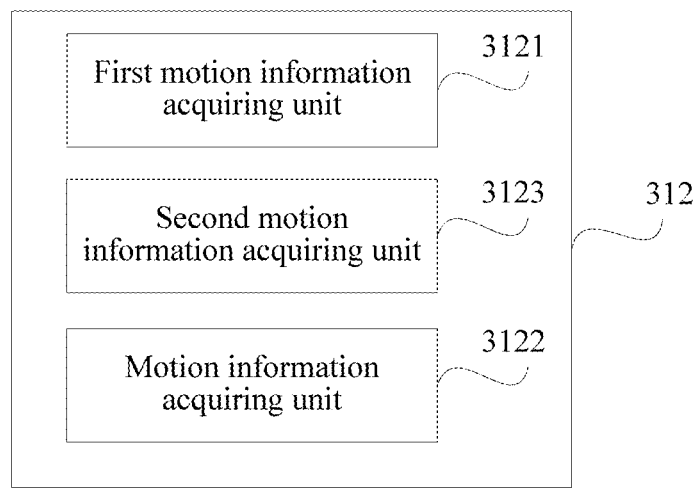
FIG. 4g is a schematic structural block diagram of an information acquiring module of an information acquiring apparatus in an example embodiment of the present application.

In another possible application scenario, for example, the object of interest of the user may also move. In this case, in a possible implementation manner, as shown in FIG. 4g, the motion information acquiring submodule 312 further comprises:

a second motion information acquiring unit 3123, configured to acquire second motion information of an object corresponding to the gaze point; and the motion information acquiring unit 3122 is further configured to acquire the motion information according to the first motion information and the second motion information.

In a possible embodiment, for example, the second motion information acquiring unit 3123 may comprise a communication component, configured to acquire the second motion information by means of communication with the object.

In another possible embodiment, for example, the second motion information acquiring unit 3123 may also be a motion sensor on a user side, and the motion sensor, for example, may be an image capture component configured to acquire an image of the object.

Figure 4H:
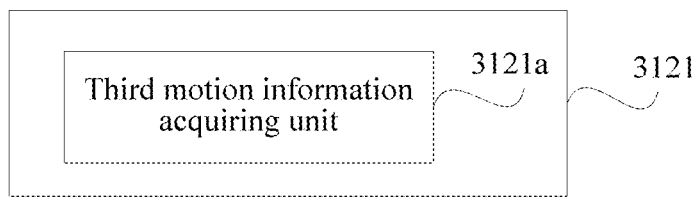
FIG. 4h is a schematic structural block diagram of a first motion information acquiring unit of an information acquiring apparatus in an example embodiment of the present application.

In a possible application scenario, the user is on a motion carrier. In this case, in a possible implementation manner, as shown in FIG. 4h, the first motion information acquiring unit 3121 comprises:

a third motion information acquiring unit 3121a, configured to acquire third motion information of the motion carrier as the first motion information.

For example, in a possible embodiment, the motion carrier is a car, and the third motion information acquiring unit 3121a, for example, may comprise a speedometer and a direction detection apparatus on the car.

In a possible application scenario, the user is a driver of the motion carrier.

For a further description of functions of modules and units in this embodiment of the present application, refer to a corresponding description in the embodiments shown in FIG. 1, FIG. 2a and FIG. 2b. Details are not described herein again.

Figure 5:
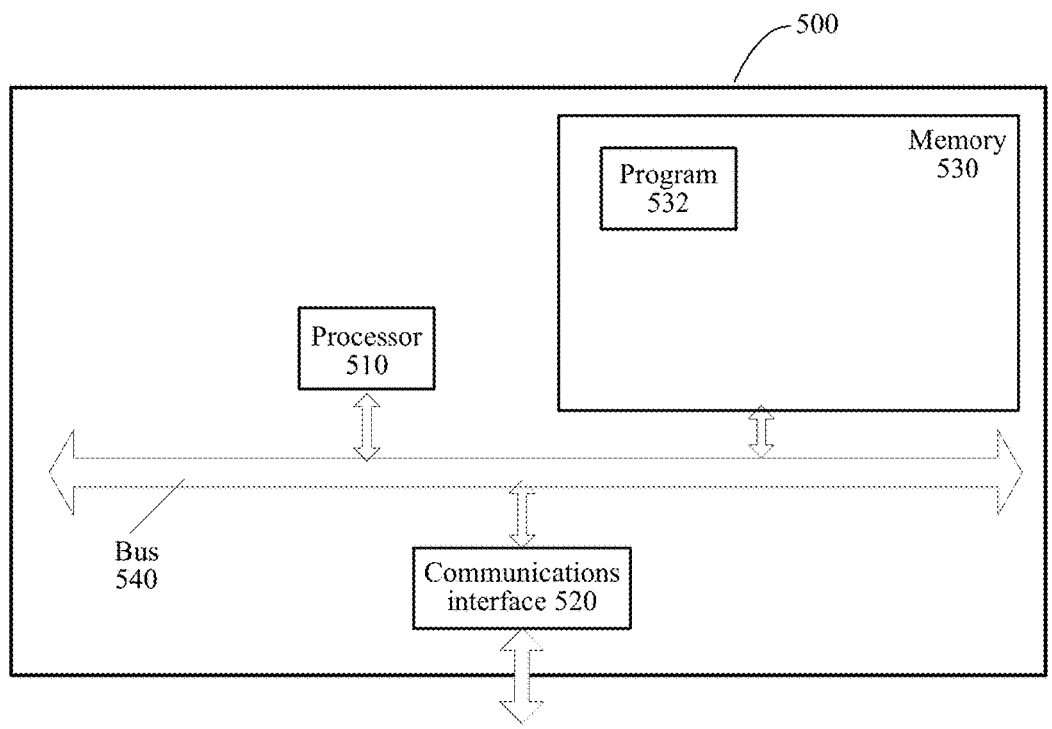
FIG. 5 is a schematic structural block diagram of an information acquiring apparatus in an example embodiment of the present application.

FIG. 5 is another schematic structural diagram of an information acquiring apparatus 500 according to an example embodiment of the present application that does not limit specific implementation of the information acquiring apparatus 500. As shown in FIG. 5, the information acquiring apparatus 500 may comprise:

a processor 510, a communications interface 520, a memory 530, and a communications bus 540.

The processor 510, the communications interface 520, and the memory 530 implement mutual communication by using the communications bus 540.

The communications interface 520 is configured to communicate with a network element, for example, a client.

The processor 510 is configured to execute a program 532, and may specifically execute related steps in the foregoing method embodiment.

Specifically, the program 532 may comprise program code, wherein the program code comprises computer operation instructions.

The processor 510 may be a central processing unit (CPU), or an application specific integrated circuit (ASIC), or may be configured to be one or more integrated circuits configured to implement the embodiments of the present application.

The memory 530 is configured to store the program 532. The memory 530 may comprise a high-speed random access memory (RAM), and may further comprise a non-volatile memory, for example, at least one magnetic disk storage. The program 532 may specifically be used to cause the information acquiring apparatus 500 to execute the following operations:

acquiring, in response to that an eye of a user in a motion state is in a smooth pursuit eye movement state, information about a change of an angle of a line-of-sight direction of the user relative to a gaze point of the user at at least one moment, and information about motion of the user relative to the gaze point at the at least one moment; and acquiring, according to the angle change information and the motion information, information about a distance of the gaze point relative to the user at the at least one moment.

For steps in the program 532, reference may be made to corresponding descriptions of corresponding steps and units in the foregoing embodiment. Details are not described herein again. Persons skilled in the art may clearly learn that, for a convenient and concise description, for a specific working process of the foregoing devices and modules, reference may be made to a corresponding process description in the foregoing method embodiment. Details are not described herein again.

Figure 6:
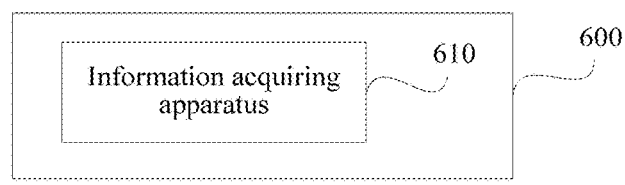
FIG. 6 is a schematic structural block diagram of a user equipment in an example embodiment of the present application.

As shown in FIG. 6, an example embodiment of the present application provides a user equipment 600, comprising an information acquiring apparatus 610. The information acquiring apparatus 610 may be the information acquiring apparatus recorded in the embodiment shown in FIG. 3 or in any one of FIG. 4 to FIG. 4h.

The user equipment 600 comprises, but is not limited to, at least one of the following: a smart phone, a pair of smart glasses, and a smart helmet, and the smart glasses comprise smart spectacles and smart contact lenses.

According to this embodiment of the present application, when an eye of a user in a motion state is in a smooth pursuit eye movement state, eye movement information and motion information of the user are acquired, to determine a distance of a gaze point of the user relative to the user, so as to conveniently determine a position of an object of interest of the user in the motion state by tracing the eye of the user.

Persons skilled in the art may be aware that, in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present application.

When the functions are implemented in a form of a software functional module and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium and comprises several instructions for instructing a computer device (which may be a personal computer, a server, a network device, or the like) to perform all or a part of the steps of the methods described in the embodiments of the present application. The foregoing storage medium comprises: any medium that can store program code, such as a USB flash drive, a removable hard disk, a read-only memory (ROM), a RAM, a magnetic disk, or an optical disc.

The foregoing example embodiments are merely used to describe the present application, but are not intended to limit the present application. Persons of ordinary skill in the art may further make various variations and modifications without departing from the spirit and scope of the present application. Therefore, all the equivalent technical solutions also fall within the scope of the present application, and the patent protection scope of the present application should be subject to the claims.

What is claimed is:

1. A method, comprising:
    acquiring, by a system comprising a processor in response to determining that an eye of a user in a motion state is in a smooth pursuit eye movement state, angle change information about a change of an angle of a line-of-sight direction of the user relative to a gaze point of the user at at least one moment, and motion information about a motion of the user relative to the gaze point at the at least one moment; and
    acquiring, by the system according to the angle change information and the motion information, distance information about a distance of the gaze point relative to the user at one or more moments in the at least one moment.

2. The method of claim 1, wherein the acquiring the angle change information comprises:
    acquiring the angle change information at least according to movement information of the eye of the user.

3. The method of claim 2, wherein the user is on a motion carrier, and
    wherein the acquiring the angle change information comprises:
    acquiring the angle change information at least according to the movement information of the eye of the user and direction change information of the motion carrier representative of a change in direction of the motion carrier at the at least one moment.

4. The method of claim 2, wherein the acquiring the angle change information comprises:
    acquiring the angle change information at least according to motion posture information of the head of the user representative of at least one of the motion of the head of the user or a posture of the head of the user, and the movement information of the eye.

5. The method of claim 1, wherein the acquiring the motion information comprises:
    acquiring first motion information of the user; and
    determining the motion information at least according to the first motion information.

6. The method of claim 5, wherein the acquiring the motion information further comprises:
    acquiring second motion information of an object corresponding to the gaze point, and
    wherein the determining the motion information at least according to the first motion information comprises:
    determining the motion information according to the first motion information and the second motion information.

7. The method of claim 5, wherein the user is determined to be on a motion carrier, and
    wherein the acquiring the first motion information comprises:
    acquiring second motion information of the motion carrier as the first motion information.

8. The method of claim 1, wherein the user is determined to be on a motion carrier, and the user is determined to be a driver of the motion carrier.

9. The method of claim 1, further comprising:
    determining, by the system, whether the eye of the user is in the smooth pursuit eye movement state.

10. The method of claim 9, wherein the determining whether the eye of the user is in the smooth pursuit eye movement state comprises:
    acquiring at least one image, wherein the at least one image comprises an eye area corresponding to the eye of the user; and
    based on at least one result of analyzing the at least one image, performing the determining whether the eye of the user is in the smooth pursuit eye movement state.

11. An apparatus, comprising:
    a memory that stores executable modules; and
    a processor, coupled to the memory, that executes or facilitates execution of the executable modules, the executable modules comprising:
    an information acquiring module configured to acquire, in response to a determination that an eye of a user in a motion state is in a smooth pursuit eye movement state, first information about a change of an angle of a line-of-sight direction of the user relative to a gaze point of the user at a set of moments, and second information about a motion of the user relative to the gaze point at the set of moments; and
    a distance acquiring module configured to acquire, according to the first information and the second information, third information about a distance of the gaze point relative to the user at at least one moment of the set of moments.

12. The apparatus of claim 11, wherein the information acquiring module comprises:
    an angle change information acquiring submodule configured to acquire the first information at least according to movement information of the eye of the user.

13. The apparatus of claim 12, wherein the user is on a motion carrier, and
    wherein the angle change information acquiring submodule comprises:
    a first angle change information acquiring unit configured to acquire the first information at least according to the movement information of the eye of the user and direction change information of the motion carrier.

14. The apparatus of claim 12, wherein the angle change information acquiring submodule comprises:
 a second angle change information acquiring unit configured to acquire the first information at least according to motion posture information of the head of the user and the movement information of the eye.

15. The apparatus of claim 11, wherein the information acquiring module comprises a motion information acquiring submodule, and wherein
 the motion information acquiring submodule comprises:
 a first motion information acquiring unit configured to acquire first motion information of the user; and
 a motion information acquiring unit configured to acquire the second information at least according to the first motion information.

16. The apparatus of claim 15, wherein the motion information acquiring submodule further comprises:
 a second motion information acquiring unit configured to acquire second motion information of an object corresponding to the gaze point; and
 the motion information acquiring unit is further configured to acquire the second information according to the first motion information and the second motion information.

17. The apparatus of claim 15, wherein the user is on a motion carrier; and
 the first motion information acquiring unit comprises:
 a third motion information acquiring subunit configured to acquire second motion information of the motion carrier as the first motion information.

18. The apparatus of claim 11, wherein the user is on a motion carrier, and the user is a driver of the motion carrier.

19. The apparatus of claim 11, wherein the executable modules further comprise:
 a smooth-pursuit determining module configured to determine whether the eye of the user is in the smooth pursuit eye movement state.

20. The apparatus of claim 19, wherein the smooth-pursuit determining module comprises:
 an image acquiring submodule configured to acquire an image, wherein the image comprises an eye area corresponding to the eye of the user; and
 an image processing submodule configured to analyze the image, and determine whether the eye of the user is in the smooth pursuit eye movement state.

21. The apparatus of claim 11, wherein the apparatus is a user equipment.

22. A computer readable storage device comprising executable instructions that, in response to execution, cause a device comprising a processor to perform operations, comprising:
 in response to determining that an eye of a user in a motion state is in a smooth pursuit eye movement state, acquiring, angle change information about a change of an angle of a line-of-sight direction of the user relative to a gaze point of the user at a moment, and motion information about motion of the user relative to the gaze point at the moment; and
 acquiring, according to the angle change information and the motion information, distance information about a distance of the gaze point relative to the user at the moment.

* * * * *